Figure 1:
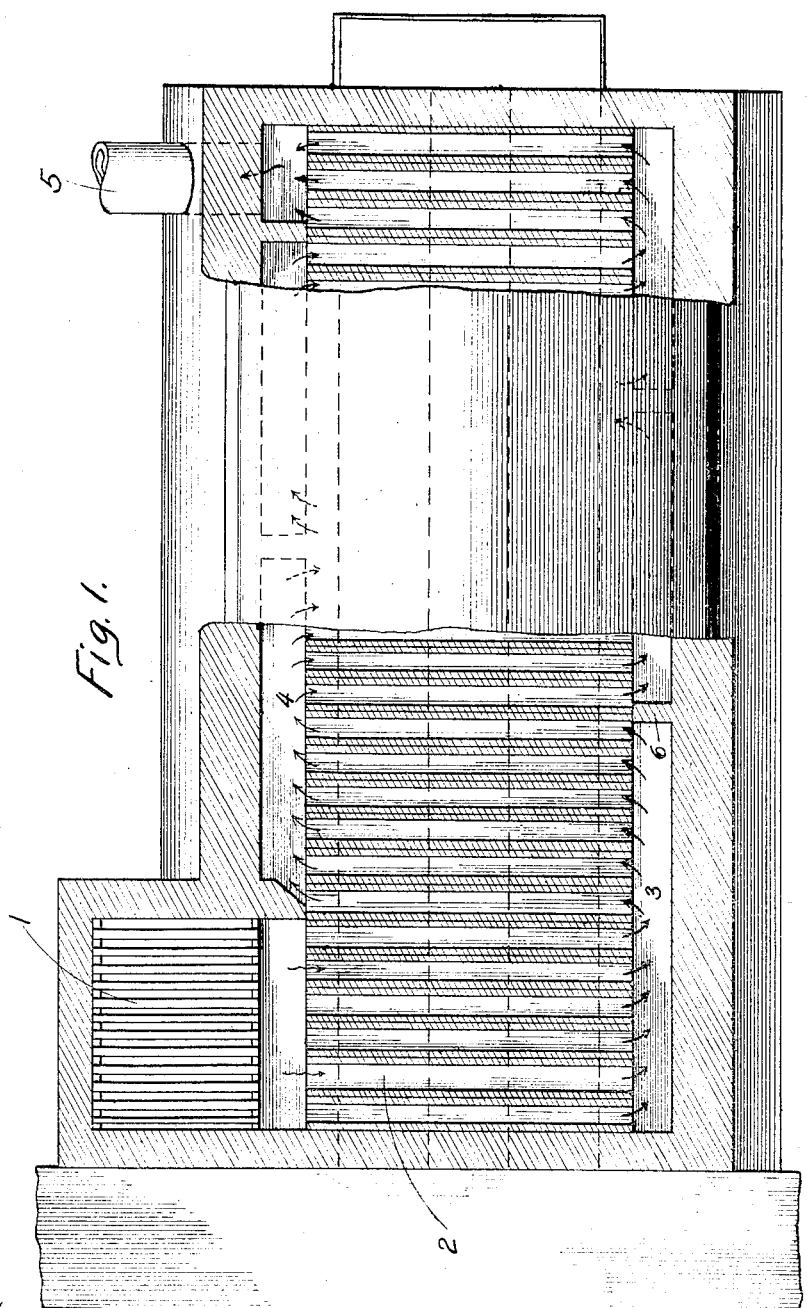

L. L. SUMMERS.
COKING FURNACE.
APPLICATION FILED MAR. 19, 1909.

943,609.

Patented Dec. 14, 1909.
8 SHEETS—SHEET 1.

Witnesses:
C. C. Dunlap
Edythe M. Anderson

Inventor
Leland L. Summers
By Sheridan, Wilkinson & Scott
Attys

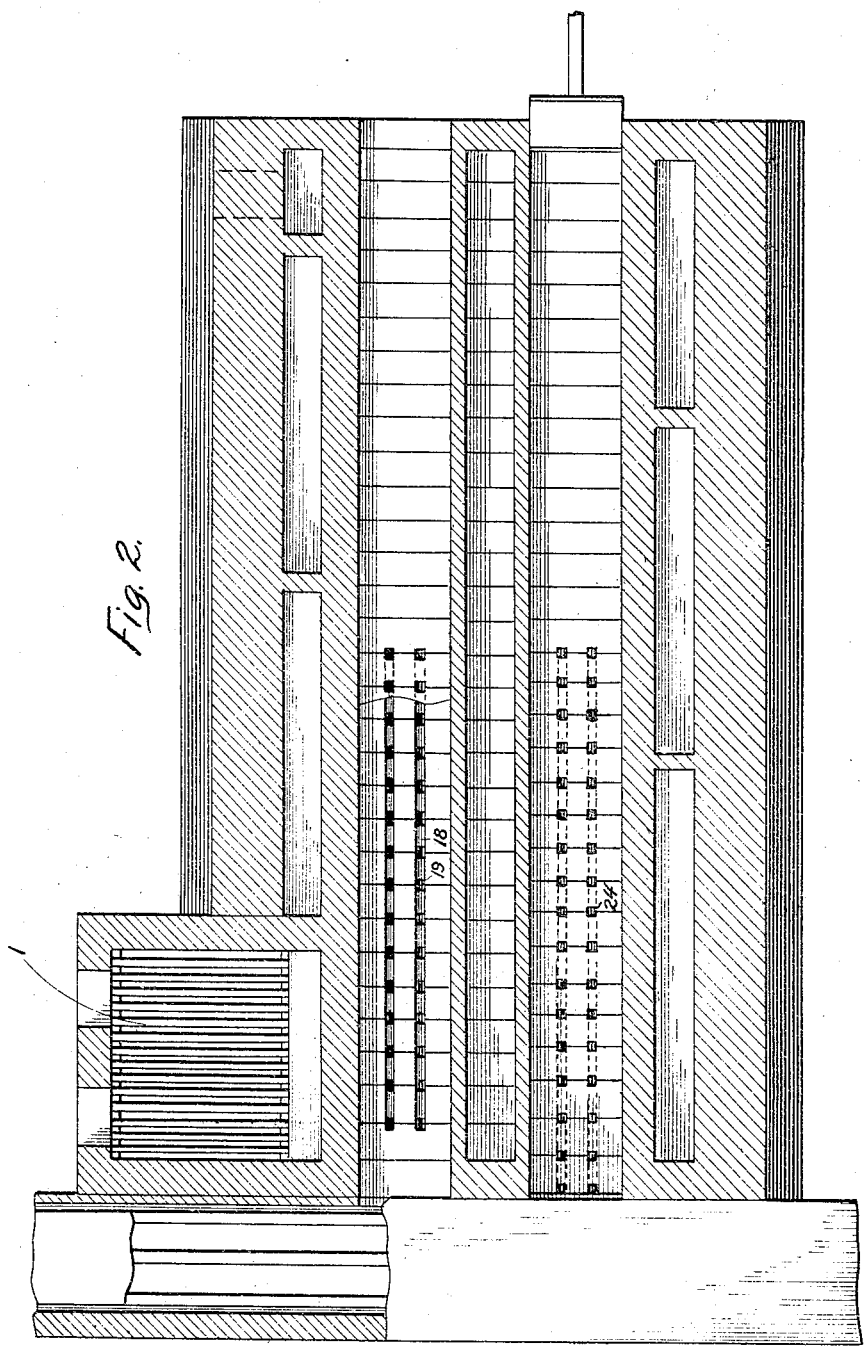

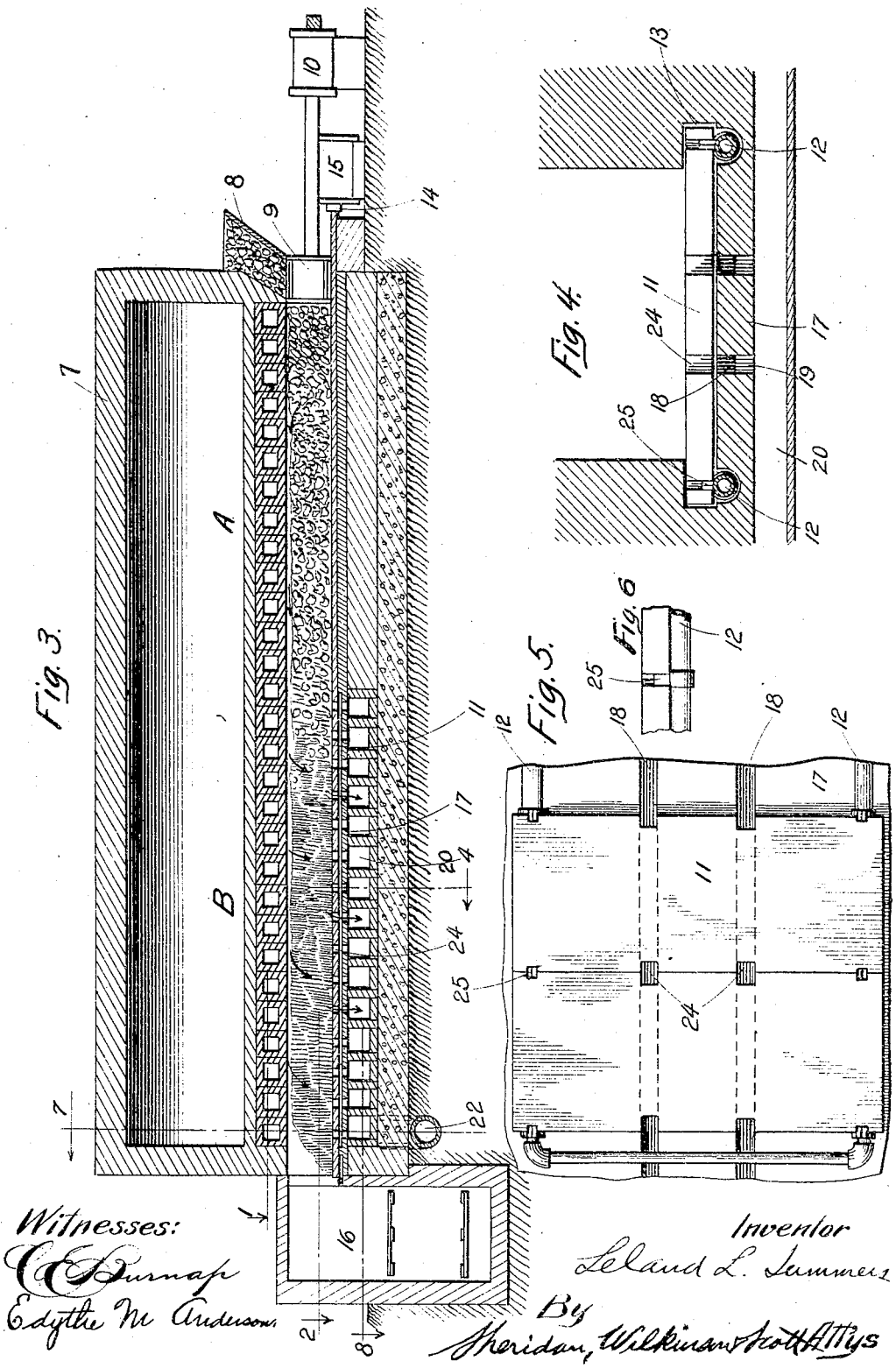

L. L. SUMMERS.
COKING FURNACE.
APPLICATION FILED MAR. 19, 1909.
943,609.
Patented Dec. 14, 1909.
8 SHEETS—SHEET 4.
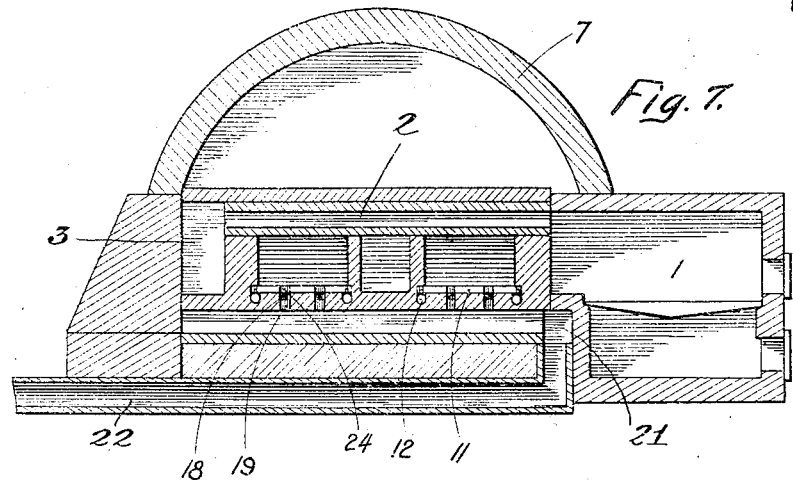
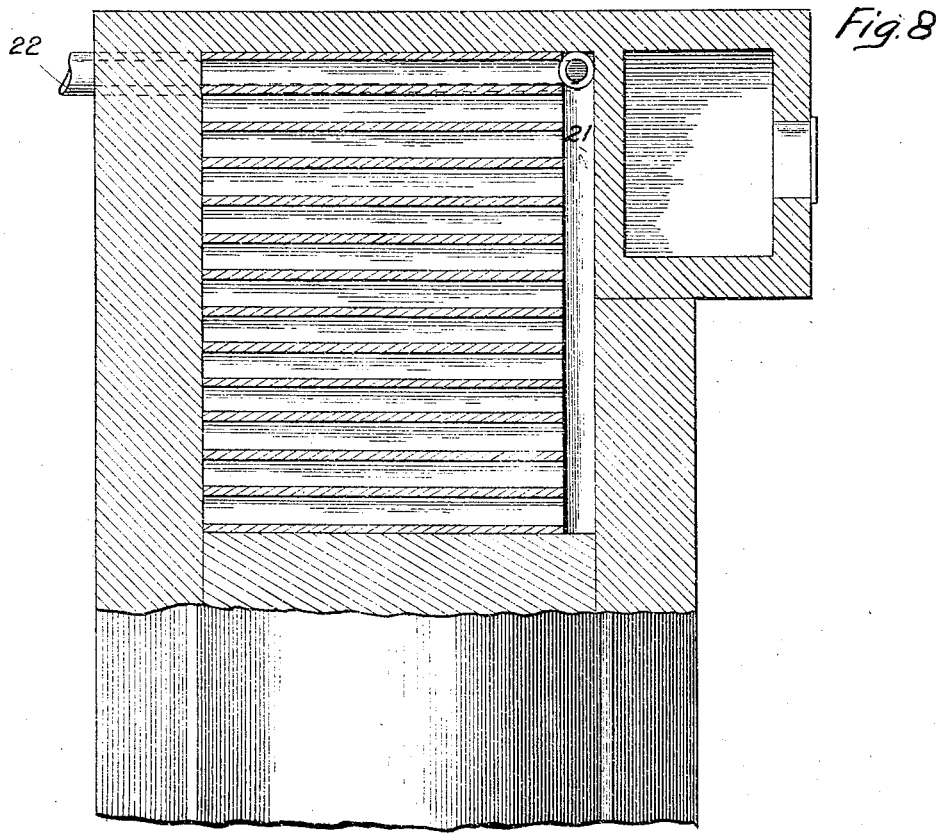
Witnesses:
Inventor
Leland L. Summers
By Sheridan, Wilkinson & Scott Att'ys

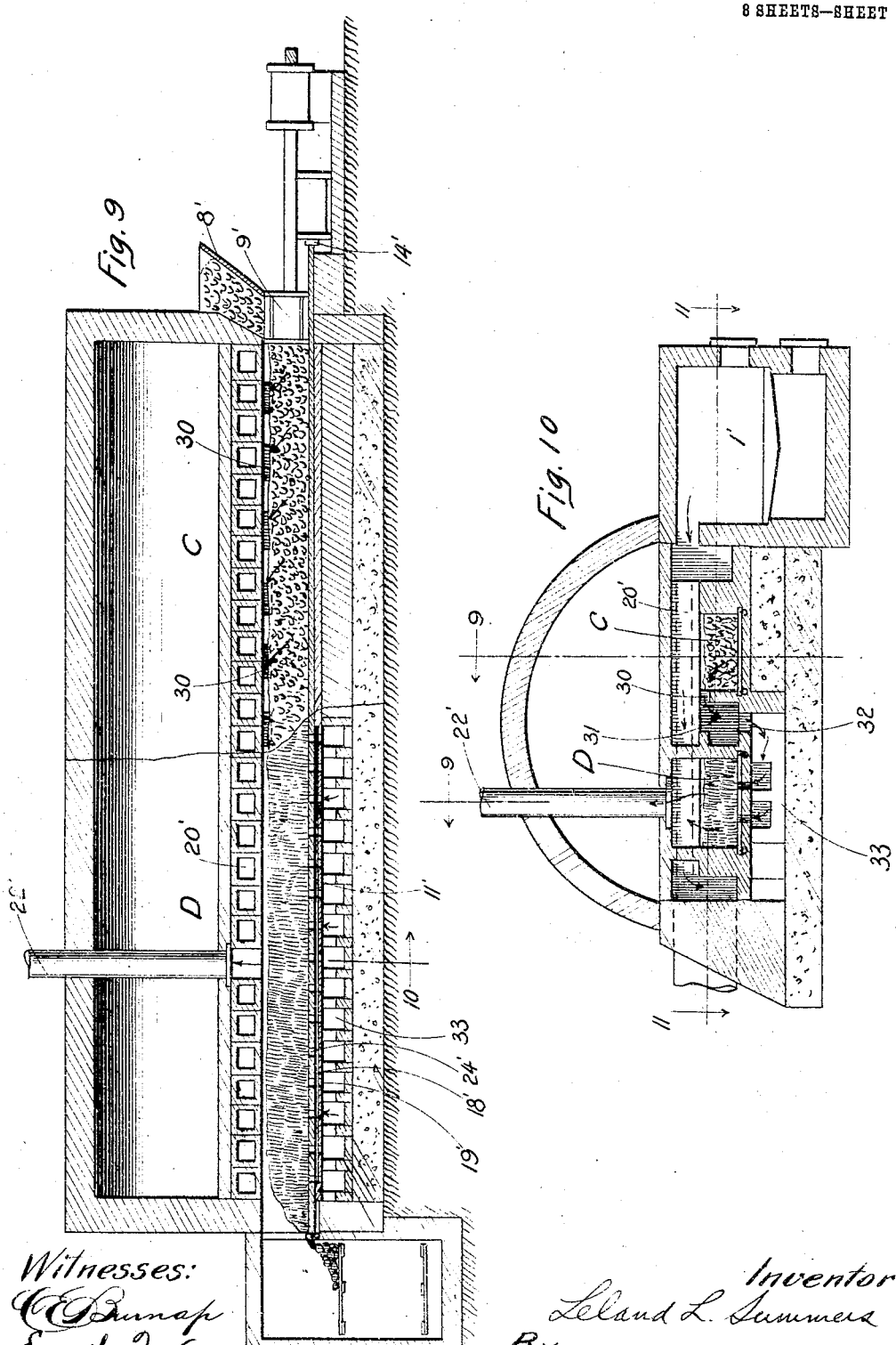

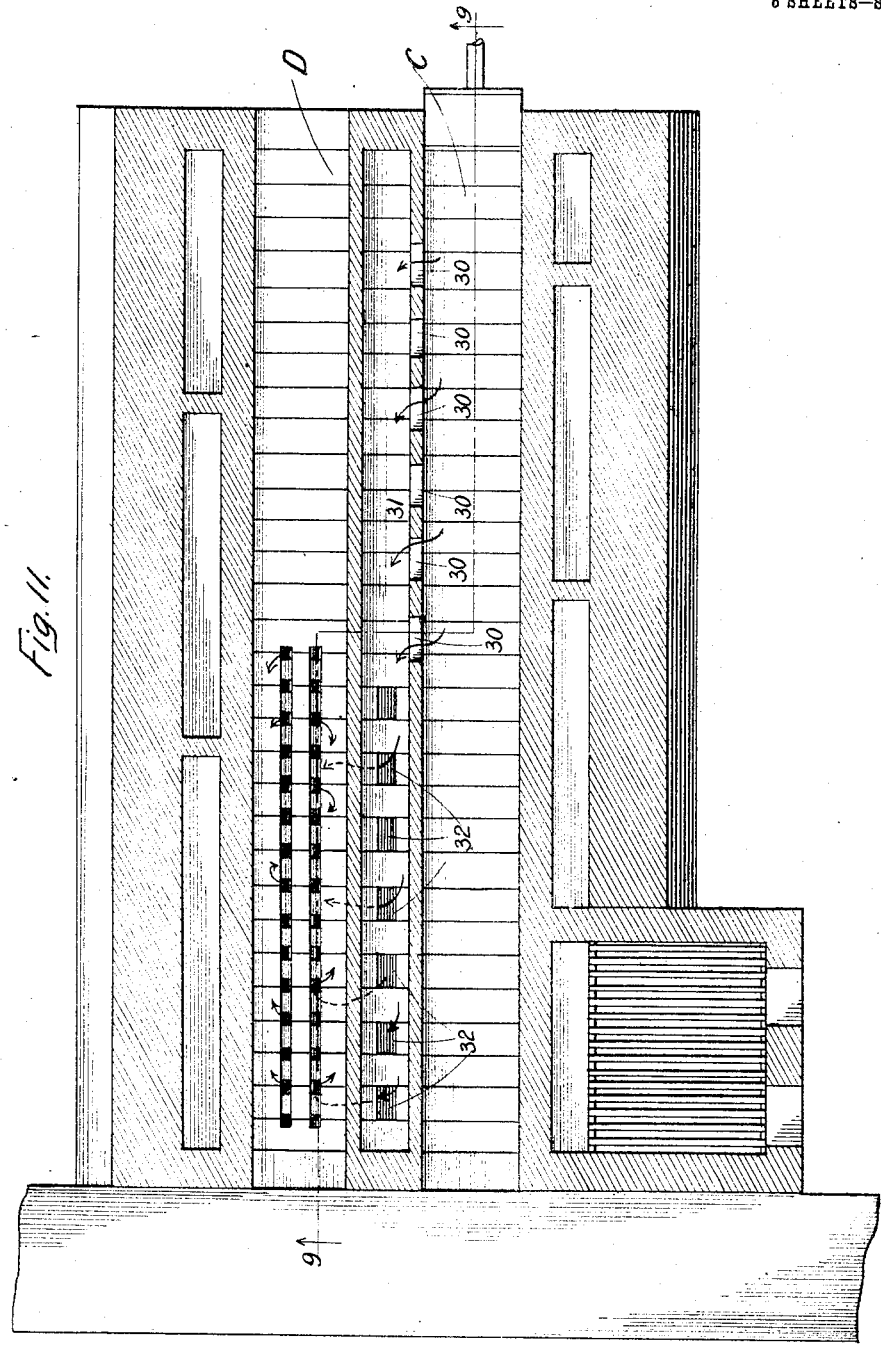

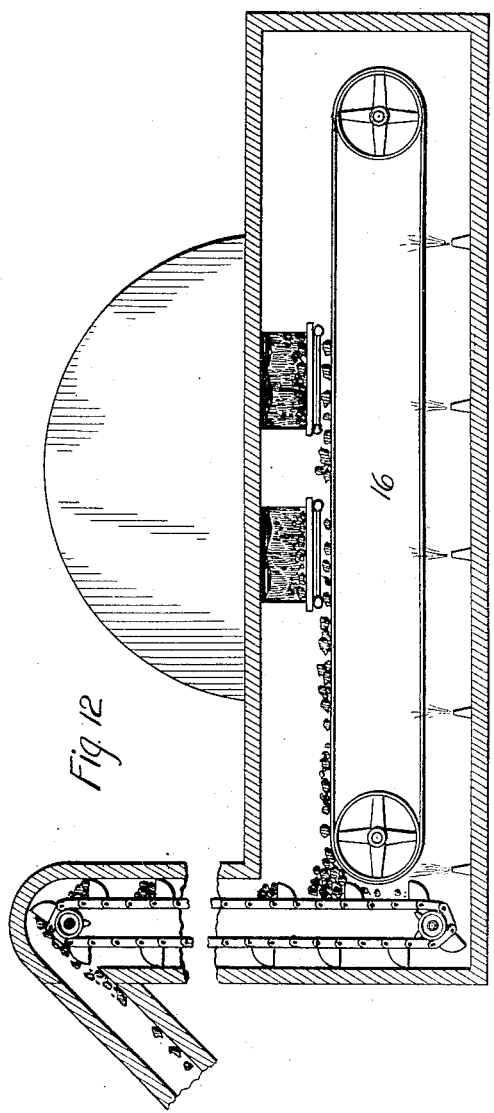

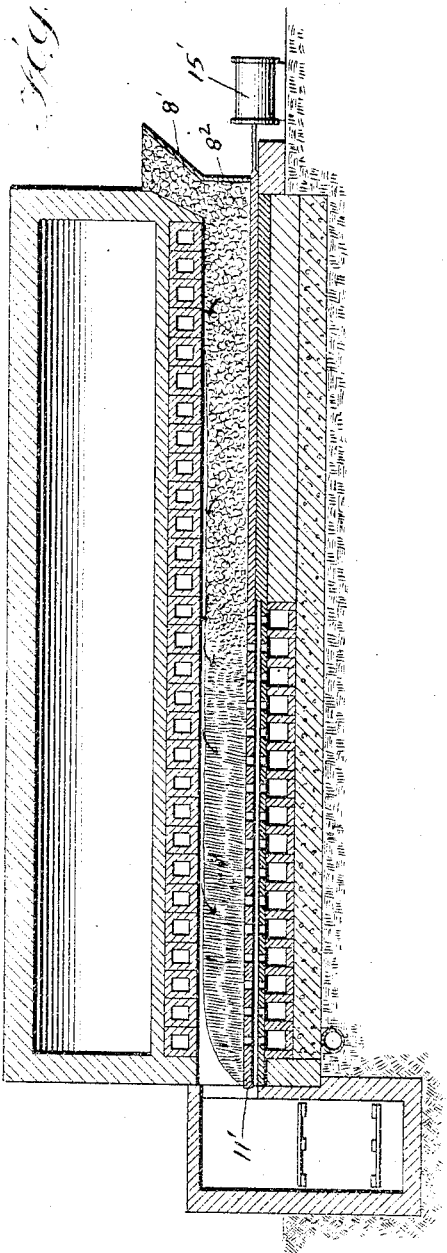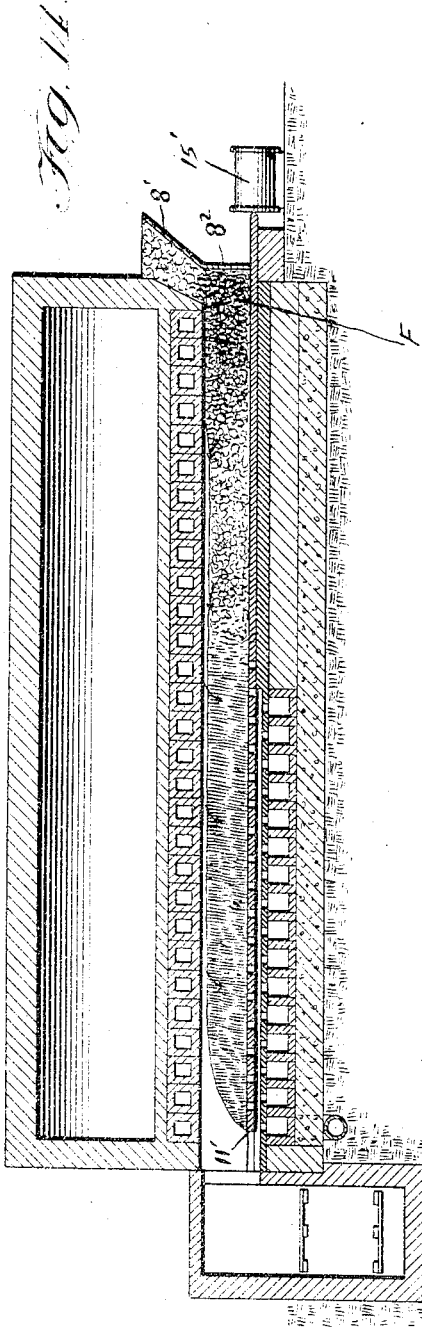

UNITED STATES PATENT OFFICE.

LELAND L. SUMMERS, OF CHICAGO, ILLINOIS.

COKING-FURNACE.

943,609.  Specification of Letters Patent.  Patented Dec. 14, 1909.

Application filed March 19, 1909. Serial No. 484,354.

*To all whom it may concern:*

Be it known that I, LELAND L. SUMMERS, a citizen of the United States, residing at Chicago, in the county of Cook and State of Illinois, have invented certain new and useful Improvements in Coking-Furnaces, of which the following is a specification.

The object of my invention is to provide an improved coking furnace wherein my improved process of coking may be conducted.

Among the features of construction and operation is the provision of means for depositing the carbon in the coke, which is ordinarily carried away in the hydrocarbon gases or so-called volatile matter. In order to accomplish this result, I construct my oven so that the volatile matter distilled from the coal is forced to pass through incandescent coal or coke having a higher temperature, whereby the volatile matters are dissociated by the high temperature, causing a certain proportion of liberated carbon, which is in the nascent state, to adhere to the highly heated coal or coke, thereby cementing the particles firmly together. By this means I have been enabled to produce a highly coherent coke from inferior grades of coal, which when treated by the ordinary coking process do not yield a commercial coke suitable for blast furnaces or other purposes.

My improved furnace is of such construction that the liberated gases after being utilized in the manner above described may be further used as fuel for the purpose of heating the furnace in which they are formed, for the recovery of by-products, or for any other desired purpose.

In my improved furnace the coal is charged at one end of a retort and discharged at the opposite end, and being subjected to a very high temperature throughout its passage, owing to its prolonged heating, the coke at the discharge end is heated to a much higher temperature than the material in the charging end.

In the drawings—Figure 1 is a plan view partly in section on the line 1 of Fig. 3, this view showing the arrangement of the heating flues. Fig. 2 is a section of the empty oven on the line 2 of Fig. 3. showing the floor of the retorts and part of the movable tile floor. Fig. 3 is a longitudinal vertical section. Fig. 4 is a fragmentary vertical section on the line 4 of Fig. 3. Fig. 5 is a plan view of part of the conveyer tiles at the discharge end of the furnace. Fig. 6 is a detail view of the connection between the conveyer tiles. Fig. 7 is a transverse section on the line 7 of Fig. 3. Fig. 8 is a fragmentary plan view in section upon the line 8 of Fig. 3. Fig. 9 is a broken longitudinal sectional elevation upon the lines 9, 9 of Fig. 10, showing another form of furnace. Fig. 10 is a transverse section on the line 10 of Fig. 9. Fig. 11 is a horizontal section of the empty oven on the line 11 of Fig. 10. Fig. 12 is a fragmentary view of the sealed outlet. Fig. 13 is a longitudinal vertical section of a retort in which the material is moved by means of a conveyer floor alone, without the assistance of a plunger. Fig. 14 is a view corresponding to Fig. 13, showing the conveyer floor drawn out.

While I have illustrated in detail structures embodying my invention it will be obvious that the particular forms shown may be widely varied without departing from my invention.

Generally speaking the apparatus illustrated in Figs. 1 to 8 comprises two parallel coke ovens, a furnace, the products of combustion arising from which circulate around the top and sides of the ovens, mechanism for feeding the carbonaceous matter progressively through the retorts or ovens from end to end, and a suitable arrangement of ducts for conducting the gases which distil at the lower temperature end of the retorts through the more highly heated coke adjacent the discharge end.

Referring to Fig. 1 the products of combustion rising from the furnace 1 pass through the ducts 2 over the top of the retorts into the longitudinal passage 3, thence back through the adjoining ducts 2 to the opposite longitudinal passage 4, and so on to and fro across the furnace until they finally escape through the pipe 5. The longitudinal passages 3 and 4, as shown in the drawing, are provided with baffles 6 for the purpose of compelling the products of combustion from the furnace to circulate back and forth over the retorts. For the purpose of conserving the heat the retorts are preferably inclosed within an arch 7. Across the charging end of the furnace is a hopper 8 to receive the coal and a plunger 9 actuated by a hydraulic cylinder 10 serves to force the coal and coke through the retort toward the discharge end.

In order to overcome the difficulty which sometimes arises in attempting to force a body of coal and coke through a long retort I have provided a conveyer in the form of a movable tile floor 11, which may be the sole means of conveying the material or may be used in connection with a plunger or other means acting directly on the material in the retort. The side walls of the retort are preferably undercut at their bases, as shown in Fig. 4, and the conveyer tiles are longer than the width of the body of the retort and project into the undercut spaces at the bases of the side walls. The tiles forming the conveyer are bound together, in the present instance by means of pipes 12. The pipes 12 are joined together at the discharge end of the tile conveyer and are kept cool by the circulation of cooling water therethrough, which in connection with the location of the pipes in the grooves 13 at the bases of the undercut portions of the side walls, affords protection against the heat of the retort. The pipes 12 may engage the conveyer tiles 11 by means of lugs 25 projecting upwardly into grooves in the edges thereof. These lugs may conveniently consist of the projecting ends of bands bolted about the pipes 12.

Coöperating with the tile conveyer floor and secured thereto is the plunger 14 of a hydraulic cylinder 15 or other source of power. In operating the device to feed coal and coke therethrough from the charging hopper 8 to the quenching trough 16, the plungers 14 and 9 are drawn outwardly in the order named, thus permitting coal to drop from the hopper 8 in front of the plunger 9, and drawing back the tile conveyer floor 11, which is secured to the plunger 14. Both plungers are then simultaneously moved inward thereby propelling the material along the retort partially by reason of the direct pressure of the plunger 9 thereon, and partially by the movement of the tile conveyer floor 11. The plunger 14 is then moved outwardly, thus drawing the conveyer floor to initial position, during which operation the plunger 9 remains stationary in its inward position, thus preventing the material from moving outward with the conveyer. The plunger 9 is then moved outward to permit a further supply of coal to descend from the hopper 8 whereupon both plungers are simultaneously moved inward. In this manner the coal is continuously fed forward in the oven without undue pressure being exerted on the walls of the oven, and a continuous feed is obtained without permitting the coal to be disturbed or crumbled, as is the case when a fragile coal is used without some form of conveyer such as the tile conveyer floor above described. It will be observed that the material adjacent the charging end of the retort is under greater pressure than that adjacent the discharge end, owing to the fact that at any point in the retort the pressure is dependent upon the amount of material between that point and the open discharge outlet where the material is relieved of all pressure. By reason of this fact the coke adjacent the discharge end assumes a more open texture, thus permitting the gases distilled at the charging end to have intimate access to all parts of the coke adjacent the discharge end.

I have found that a satisfactory movement of the material through the retort may be effected by means of the conveyer floor alone, a stripper being provided above the conveyer at the inlet end. Such a structure is illustrated in Figs. 13 and 14, or if the plunger 9 shown in connection with the coking furnace be withdrawn sufficiently to permit the coal to fall in front of it and the plunger be then held stationary the material may be fed by actuating the conveyer floor alone. Whether the plunger 9 be actuated to feed the coal directly or not it acts as a stripper to prevent backward movement of the material when the conveyer is drawn out.

In Figs. 13 and 14 I have illustrated a retort in which no plunger is used, the material being moved by means of the conveyer floor alone. In this form of retort the wall 8' of the hopper is provided with a lower part 8² which extends into proximity with the upper surface of the conveyer floor 11', the hopper opening being directly above the charging end of the conveyer floor. In Fig. 13 the conveyer floor is shown in its inner position, just after completing the movement which carries the material toward the discharge end of the retort. As the material is moved inward by the inward movement of the conveyer floor, additional material falls from the hopper upon the outer end of the conveyer floor. After the inward movement of the conveyer floor is completed and the parts have arrived at the position shown in Fig. 13, in which position a charge of fresh material rests upon the outer end of the conveyer floor, the floor is drawn outwardly to the position shown in Fig. 14. The material upon the conveyer floor is prevented from moving outwardly by the wall 8². The outward movement of the conveyer floor, however, tends to move the material outwardly with it and thus compresses the material against the wall 8² as illustrated at F, at which point the greater density of the material due to the compression is indicated by heavier lines upon the drawing. This compression of the material serves to prepare it for being coked in a coherent compact mass. Furthermore, the presence of this compressed body of material, together with the material in the hopper resting thereon, acts to effectually close the charging end of the retort against the admission of air or the escape of gases. When the conveyer floor 11' is moved inwardly through the actuation of the hydraulic cylinder 15', or other mechanism employed for that purpose, the compressed charge F is carried inwardly and additional fresh material drops down from the hopper. A repetition of these steps effects a continuous feed and keeps the charging end of the oven effectually closed without the use of doors or other expedients.

In order to subject the coke at the high temperature or discharge end of the oven to the action of the gases distilled at the lower temperature from the coal at the charging end I provide the fixed floor 17 for about half its length at the discharge end with longitudinal grooves 18, and from the bases of these grooves apertures 19 communicate with ducts 20 below the stationary floor. The ducts 20, as formed in the specific embodiment of the oven illustrated, open at one end into a header 21 through which they communicate with an outlet pipe 22 which may discharge into the atmosphere or into any suitable apparatus for storing or treating the discharged gases. Preferably a slight suction is maintained in the discharge pipe 22 to induce a circulation of gases downward through the heated coal or coke in the discharge end of the oven.

The forward or discharge portion of the tile conveyer floor is provided with openings 24 registering with the grooves 18 in the stationary floor. By this means continuous communication is provided through the tile conveyer floor and stationary floor from the inside of the oven to the ducts 20 regardless of the position of the tile conveyer floor.

The quenching trough 16 may be equipped with any suitable form of conveyer for carrying away the coke and coal may be supplied to the hopper 8 from cars or a conveyer. In order to seal the retorts against access of atmospheric oxygen the quenching trough is preferably covered over as illustrated and the conveyer shown in Fig. 12 communicates with the exterior of the trough through a closely fitting conduit. The steam arising from the contact of the quenching sprays with the hot coke gives rise to an outward current through the conveyer conduit which effectually prevents access of atmospheric air. I guard against the entrance of air into the retorts for the reason that if atmospheric air were permitted to enter its oxygen would combine with the carbon liberated from the distilled gases thus preventing the deposition of the carbon in the coke and the desired cementing action.

In operation the furnace 1 will be fired and the products of combustion therefrom passing through the hollow tiles 2 from the discharge end to the charging end of the oven will impart the requisite heat for the coking process. The gases distilled from the coal at the charging end of the oven, designated in Fig. 3 by the letter A, will rise to the upper part of the oven, as indicated by the arrows, and pass along beneath the roof of the oven toward the discharge end B. Owing to the suction maintained in the pipe 22 and the fact that the discharge end of the oven is closed by a seal or otherwise the gases which are distilled at the low temperature charging end of the oven will after passing along toward the discharge end descend through the highly heated coke in that part of the oven passing through the apertures 24, grooves 18 and apertures 19 into the ducts 20 and thence to the atmosphere or such storing or treating apparatus as may be used. Thus the percentage of the so-called illuminants, or higher hydrocarbons, is diminished by the continued contact with the high temperature coal or coke, and the carbon freed by the decomposition of the gases, is deposited in the coal or coke, either in the form of a cementing carbon or as a coating which assumes a graphitic structure upon cooling. The action of thus depositing carbon in the interstices of the highly heated coal or coke is the basis of the so-called coking action and tends to form a coke structure very dense and hard.

By the action of the carbon on the highly heated coal or coke, it is possible to form a coherent coke from coals that ordinarily resist coking action, and are therefore termed non-coking coals.

In Figs. 9 to 11 I have illustrated another form of apparatus in which my improved process may be carried out. Generally speaking this form differs from that above described principally in the fact that low distillation products are taken from one oven and conducted to a higher temperature zone in an adjacent oven, instead of conducting the gases from one part to another of the same oven. In this form of apparatus the means for feeding the material through the ovens is similar to that above described, comprising a hopper 8', plungers 9' and 14', and tile conveyer floor 11'. The manner of heating the ovens C and D is also the same as that explained in connection with the oven above described. The oven C adjacent its top and preferably in the side wall is provided with a series of apertures 30 communicating with a longitudinal duct 31, which extends to the discharge end of the furnace. Adjacent the discharge end of the furnace and extending about half its length are a series of openings 32 in the floor of the duct 31 communicating with a series of ducts 33 beneath the floor of the oven D. The ducts 33 communicate with the interior of the discharge end of the oven D through apertures in the stationary floor and in the tile conveyer floor in the manner above explained in connection with the oven previously described, the stationary floor being provided with longitudinal grooves 18' in the bases of which are apertures 19'. The tile floor is provided with registering apertures 24'. An outlet pipe 22' communicates with the interior of the oven D adjacent the discharge end. After heating the oven by means of the furnace 1' the products of combustion from which pass through the flues 20' the apparatus is charged with coal. As in the form of oven above described the discharge ends of the retorts are preferably sealed by a water seal or otherwise and a slight suction may be maintained in the outlet pipe 22'. The gases distilled at the charging end of the oven C will pass through the apertures 30 into the longitudinal duct 31, thence toward the discharge end of the apparatus downwardly through the apertures 32 into the ducts 33, whence the gases will pass upward through the highly heated material in the discharge end of the oven D and outward through the outlet pipe 22' to the atmosphere or to storing or treating apparatus as may be desired. Chemically, the action of this oven corresponds with that shown in Figs. 1 to 8, inclusive, the gases distilled at the low temperature end of the oven C passing through the highly heated material at the discharge end of the oven D, where the gases are dissociated and the freed carbon deposited, thereby cementing the coke in the discharge end of the oven D and forming a coherent mass.

Referring to Fig. 11, it will be obvious that the arrangement there shown may be continued indefinitely throughout a series of ovens, instead of using a single pair as shown. For instance the low temperature distillates from the charging end of the oven D might be conducted to the highly heated coke in the discharge end of a third oven, and the gases from the third oven might be conducted to a fourth and so on to the extent desired.

In connection with a short retort the plunger or other means acting directly on the coal is not in all cases necessary, but when a long retort is used the plunger acting directly on the coal facilitates its movement. Even in the case of a long retort, however, the plunger may be withdrawn sufficiently to permit the coal to drop in front of it and then allowed to remain stationary for the greater part of the time, acting merely as a stripper for the conveyer floor. As occasion requires when the movement of the material is not satisfactory the plunger acting directly upon the coal may be temporarily brought into action.

One of the difficulties incident to the formation of coke in a horizontal oven heated from an arch above the coke arises from the fact that the shrinkage of the material as the coking process progresses results in drawing the coke away from the source of heat at the top of the retort, thereby leaving a space which interferes with the effective transmission of heat from the arch to the coke. If the gases be drawn off through the roof of the retort the direction of movement of the gases, being upward, is adverse to the transmission of heat to the coke by convection through the gases as a medium, and furthermore, the gases are conducted away from the retort without imparting their own heat to the contents of the retort. On the other hand a still body of gas above the coke does not form an efficient agent for the transmission of heat downward from the arch. In the operation of my improved oven, however, these difficulties are overcome. In the form of oven illustrated in Fig. 3 the gases distilled at the charging end, A, of the oven pass downward through the highly heated coke at the discharge end, thus moving in the direction of the radiation of heat from the flues at the discharge end. The gases thereby act as a vehicle to conduct heat from the arch into the coke.

While the apparatus above described is suitable for conducting my improved process, it will be apparent that the furnace is susceptible of a wide degree of variation without departure from the principle of my invention.

I claim:

1. In a coking furnace, means for moving material therethrough from end to end, means for maintaining said material at a progressively increasing temperature from the charging to the discharge end of the retort, and means intermediate the ends of said retort for compelling gases distilled from the less highly heated part of said material to pass through the more highly heated part, in a direction parallel to the radiation of heat thereto.

2. In a coking furnace a retort, means for moving material therethrough from end to end, means for heating said retort, means intermediate the ends of said retort for compelling gases distilled from the cooler freshly charged material to pass through previously charged hotter material having a temperature sufficiently high to decompose said gases and cause the deposition in said material of cementing carbonaceous substances, said means compelling said gases to move through said material in a direction parallel to the radiation of heat thereto.

3. A coking furnace comprising a retort, means for maintaining the discharge end of the retort at a higher temperature than the charging end, means for feeding material into said retort at its cooler end, and means for compelling the gases distilled in the retort from the less highly heated portion of the material to pass through the more highly heated portions in a direction parallel to the radiation of heat thereto.

4. A coking furnace comprising a retort, means for heating said retort to progressively higher temperatures from the charging to the discharge end, means for feeding material to the charging end of said retort and means for conveying said material to the discharge end, and means for compelling the gases distilled at the charging end to pass through the material adjacent the discharge end.

5. In a coking furnace, a retort, a movable floor in said retort, a support for said movable floor, said movable floor being provided adjacent the discharge end of the retort with apertures for the escape of distilled gases.

6. A coking furnace comprising a retort, means for feeding material therethrough from end to end, means for heating said retort, said retort being provided with apertures in its lower part adjacent the discharge end for the passage of the distilled gases.

7. In a coking furnace, a retort comprising a stationary floor or bed provided with apertures, a movable floor provided with registering apertures, and means for imparting movement to said movable floor.

8. In a coking furnace, a retort comprising a stationary floor or bed provided with apertures, a movable floor provided with registering apertures, ducts communicating with said apertures, and means for imparting movement to said movable floor.

9. A coking furnace comprising a retort having a charging inlet and a discharge outlet, ducts beneath and communicating with said retort adjacent its discharge end, a conveyer floor in said retort, and means for imparting movement to said conveyer floor.

10. A coking furnace comprising a retort having a charging inlet and a discharge outlet, ducts beneath said retort adjacent its discharge end and communicating therewith through apertures in the floor of said retort, a conveyer floor in said retort having apertures registering with the apertures in the floor thereof, and means for imparting movement to said conveyer floor.

11. A coking furnace comprising a retort, a conveyer floor therefor, feeding means at the charging end of said retort acting directly upon said material, and independent means acting upon said conveyer floor.

12. A coking furnace comprising a retort, a stationary floor and a conveyer floor therefor, ducts beneath said retort adjacent its discharge end and communicating with said retort through apertures in said stationary and conveyer floors, an outlet pipe leading from said ducts, direct feeding means acting upon the material in said retort and conveyer actuating means to reciprocate said conveyer floor, said direct feeding means and conveyer feeding means being adapted to act together or independently.

13. A coking furnace comprising a retort, means for feeding material therethrough from end to end, heating ducts adjacent said retort, ducts for distilled gases extending through a portion of the length of said retort adjacent its discharge end, said distilled gas ducts communicating with said retort through a plurality of apertures.

14. In a coking furnace, a retort, a movable conveyer floor for said retort, said floor comprising a series of tiles, means connecting said tiles together, and means for imparting movement to said series of tiles.

15. A retort comprising side walls having undercut recesses at the bases thereof, a conveyer comprising a series of tiles, said tiles being of greater width than said retort and extending into said recesses, and means in said recesses for connecting said tiles.

16. A retort comprising side walls having undercut recesses at the bases thereof, a conveyer comprising a series of tiles, said tiles being of greater width than said retort and extending into said recesses, and water-cooled pipes in said recesses, said pipes being operatively connected to said tiles.

17. In a continuous coking furnace, a retort, means for feeding material therethrough, said retort being sealed at its ends and throughout a portion of its length provided at its base and adjacent the discharge end with apertures for the escape of the volatile products.

18. In a continuous coking furnace a retort, means for feeding material therethrough from end to end, heating ducts or flues extending over the top of said retort from end to end, outlet passages being provided in the floor of said retort adjacent its discharge end, and ducts communicating with said outlet passages.

19. In a device of the class described, an exterior roof, a retort, a heating furnace, heating flues leading from said furnace and traversing the top of said retort, said retort and heating flues being separated from said roof by an air space, a hopper and feeding mechanism for moving material through said retort, a seal at the discharge end of said retort, ducts beneath said retort adjacent the discharge end, said ducts communicating with said retort through apertures in the floor thereof.

20. In a coking furnace, a retort, a movable floor in said retort, said floor comprising a series of tiles, actuating bars, means upon said bars engaging said tiles, and means connected to said bars for reciprocating said tiles.

21. In a coking furnace, a retort, a movable floor therein, a ram for reciprocating said floor, a ram acting directly upon the material deposited on said conveyer, said rams having independent actuating means to permit both to be moved inward simultaneously and to permit the conveyer to be withdrawn in advance of the withdrawal of the ram acting directly upon the material conveyed.

22. A coking furnace comprising a retort, means for heating said retort, a movable floor in said retort, means for supplying material to said floor at one point and withdrawing material from said floor at another point and for excluding air from said retort during said operations.

23. A coking furnace comprising a retort, means for heating said retort, a reciprocating floor in said retort, means for supplying material to said floor at one point and withdrawing material from said floor at another point and for excluding air from said retort during said operations.

In testimony whereof, I have subscribed my name.

LELAND L. SUMMERS.

Witnesses:
WALTER A. SCOTT,
EDYTHE M. ANDERSON.